United States Patent

Terasawa

[11] Patent Number: 4,709,997
[45] Date of Patent: Dec. 1, 1987

[54] ZOOM LENS
[75] Inventor: Hidenori Terasawa, Kawasaki, Japan
[73] Assignee: Nippon Kogaku K. K., Tokyo, Japan
[21] Appl. No.: 602,962
[22] Filed: Apr. 23, 1984
[30] Foreign Application Priority Data Apr. 27, 1983 [JP] Japan ................................. 58-74539

[51] Int. Cl.⁴ ............................................. G02B 15/00
[52] U.S. Cl. ..................................... 350/427; 350/450
[58] Field of Search ................. 350/427, 423, 450, 475
[56] References Cited

U.S. PATENT DOCUMENTS 3,937,562  2/1976  Muszumanski et al. ............. 350/423
4,506,958  3/1985  Imai ..................................... 350/427

Primary Examiner—Bruce Y. Arnold
Assistant Examiner—P. M. Dzierzynski
Attorney, Agent, or Firm—Shapiro and Shapiro

[57] ABSTRACT

A zoom lens in which fluctuation of lateral chromatic aberration is small has, in succession from the object side, a first group of positive refractive power including at least one positive lens, a second group of negative refractive power including at least one negative lens, and an aperture stop disposed closer to the image plane than the second group. Each of the groups is moved on the optic axis during magnification change so that the distance between the first group and the second group becomes greater and the distance between the second group and the aperture stop becomes smaller as the focal length of the entire system becomes longer. At least one of negative lenses constituting the second group is formed of a material which satisfies the following conditions:

$$\nu d + 596.7\theta > 386.5$$

$$\nu d > 55,$$

where when the refractive indices of the lens material for wavelengths 436 nm (g-line), 486 nm (F-line), 588 nm (d-line) and 656 nm (c-line) are ng, nF, nd and nc, respectively, $\nu d$ and $\theta$ are defined as follows:

$$\nu d = (nd - 1)/(nF - nc)$$

$$\theta = (ng - nF)/(nF - nc).$$

12 Claims, 19 Drawing Figures

ZOOM LENS

BACKGROUND OF THE INVENTION

1. Field of the Invention

This invention relates to a zoom lens, and in particular to a zoom lens of high performance in which fluctuation of aberrations is small during magnification change.

2. Description of the Prior Art

Generally, a zoom lens has it focal length variable continuously and can therefore vary its image magnification continuously for an object at a predetermined distance and thus is very convenient, but in the zoom lens, the fluctuation of aberrations resulting from magnification change is great and therefore it is difficult to maintain an excellent imaging performance over the entire magnification change range. Accordingly, to change the photographing magnification in the enlargement work of photographed film or the reduction (enlargement) copying work, the following two methods using a fixed focal length lens have often been adopted.

One of the two methods is a method using a fixed focal length lens to change the object-image distance and the position of the lens, and the other is a method interchangeably using a plurality of fixed focal length lenses to obtain different kinds of magnifications equal to the number of the lenses. The former has a disadvantage that the apparatus becomes bulky because the object-image distance is greatly varied, and the latter has a disadvantage that only dispersive magnifications can be obtained.

To eliminate these disadvantages, in recent years, it has been desired to use a zoom lens also for enlargement or copying and make the most of the above-described advantages of the zoom lens. However, the performance required of the enlarging or copying lens system is very severe and it is necessary to well correct not only distortion and curvature of image field but also lateral chromatic aberration, and it has been very difficult to realize it.

SUMMARY OF THE INVENTION

It is an object of the present invention to provide a zoom lens in which fluctuation of aberrations, particularly, lateral chromatic aberration, is small during magnification change and which can maintain an excellent imaging performance over the entire magnification change range. It is a further object of the present invention to provide a zoom lens of high performance for a finite distance which, when the distance between the object surface and the image plane is finite and constant, can continuously effect magnification change while keeping the distance constant.

The present invention is a zoom lens which has, in succession from the object side, a first group of positive refractive power, a second group of negative refractive power and an aperture stop disposed more adjacent to the image plane than the second group and in which, as the focal length of the entire system becomes longer, the distance between the first group and the second group becomes greater and the distance between the second group and the aperture stop becomes smaller, characterized in that at least one of negative lenses constituting the second group is formed of a material of abnormal dispersiveness. Heretofore, generally, a material of abnormal dispersiveness has been used for a positive lens and this has played a great role in correcting the secondary spectrum of chromatic aberration, whereas in the present invention, the material of abnormal dispersiveness is used for a negative lens in the negative lens group, whereby it has been found that the fluctuation of lateral chromatic aberration during magnification change can be corrected very well.

The invention will become more fully apparent from the following detailed description thereof taken in conjunction with the accompanying drawings.

DESCRIPTION OF THE PREFERRED EMBODIMENTS

Figure 1:
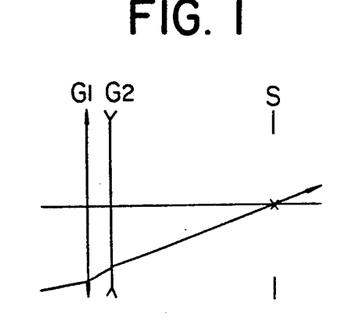
FIGS. 1 and 2 illustrate a zoom lens according to the present invention.
Figure 2:
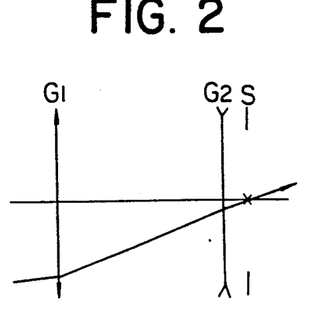
Figure 3:
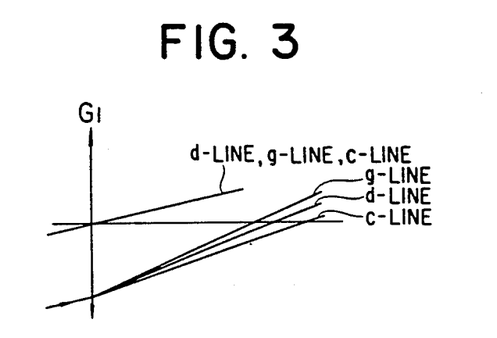
FIGS. 3 and 4 illustrate lateral chromatic aberration.
Figure 4:
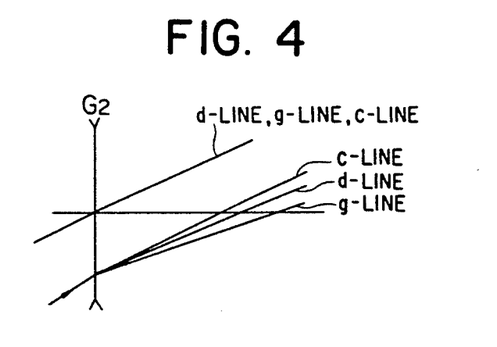

The present invention will hereinafter be described with reference to the drawings. In a zoom lens wherein the number of groups constituting the entire system is three or more and in succession from the object side, a first group $G_1$ generally has a positive focal length, a second group $G_2$ generally has a negative focal length, an aperture stop S is positioned closer to the image plane than the second group $G_2$, the distance between the first group and the second group becomes longer as the focal length of the entire system is increased and the distance between the second group and the aperture stop becomes shorter as the focal length of the entire system is increased. Considering the principal light ray which arrives at the circumference of the picture plane, it is as shown in FIG. 1 when the focal length of the entire system is small, and is as shown in FIG. 2 when the focal length of the entire system is great. In FIGS. 1 and 2, lens groups positioned closer to the image side than the second group $G_2$ are not shown. Also, as regards the general state in which lateral chromatic aberration occurs in the first group $G_1$ and the second group $G_2$, as shown in FIGS. 3 and 4, respectively, in the first group $G_1$, the short wavelength side ray (g-line: $\lambda = 435.8$ nm) occurs outside on the image plane and the long wavelength side ray (c-line: $\lambda = 656.3$ nm) occurs inside (the optic axis side), because the focal length of the first group is positive. If achromatization of lateral chromatic aberration for the g-line and c-line is effected in the first group $G_1$, the g-line and c-line will lie inside for the medium wavelength (d-line: $\lambda = 587.6$ nm, F-line: $\lambda = 486.1$ nm) because generally the g-line is greater in movement than the c-line. In the second group $G_2$, the short wavelength side ray and the long wavelength side ray occur conversely to the case of the positive first group because the focal length of the second group is negative. In the zoom lens as described above, the power of the second group is usually greater than that of the first group and therefore, in this case, as shown in FIG. 1, when the focal length of the entire system is small, the principal light ray passes through a position spaced apart from the optical axis in both of the first group $G_1$ and the second group $G_2$, but the influence of the second group $G_2$ is greater and on the image plane, the g-line and c-line lie outside relative to the d-line and F-line. When the focal length of the entire system is great, as shown in FIG. 2, the second group G₂ becomes more distant from the first group G₁ and comes close to the stop S and therefore, the influence of the second group G₂ becomes very small and the influence of the first group G₁ becomes greater and thus, on the image plane, the g-line and c-line lie inside relative to the d-line and F-line. Accordingly, fluctuation of lateral chromatic aberration occurs as magnification change is effected. To eliminate such lateral chromatic aberration, the construction of the third and other groups may be contrived so as to negate the fluctuation of lateral chromatic aberration rearwardly of the second group G₂, but it is difficult to sufficiently correct the fluctuation itself.

Thus, the present invention uses a glass material having a special part dispersion ratio for the second group to enable any fluctuation of lateral chromatic aberration to be corrected.

That is, when the refractive indices of lens material for wavelengths 436 nm (g-line), 486 nm (F-line), 588 nm (d-line) and 656 nm (c-line) are ng, nF, nd and nc, respectively, and $$vd = (nd-1)/(nF-nc)$$

as the dispersion (Abbe number) and $$\theta = (ng-nF)/(nF-nc)$$

as the part dispersion ratio are adopted, by choosing for at least one of the negative lenses constituting the negative second group a glass material which satisfies the conditions that $$vd + 596.7\theta > 386.5 \quad (1)$$

$$vd > 55 \quad (2),$$

fluctuation of lateral chromatic aberration is corrected to a very small value. By choosing a glass material which satisfies these conditions, the secondary spectrum of the lateral chromatic aberration the focal length of the entire system is small can be improved without so much aggravating the lateral chromatic aberration when the focal length of the entire system is great. The use of such a glass material generally increases the secondary spectrum of on-axis chromatic aberration, but it is often allowable when the open F-value of the entire system is great and, where it is not allowable, it is possible to recover the secondary spectrum by using a glass material having abnormal dispersiveness in the groups other than the first and second groups. If the limit of condition (1) is departed from the abnormal dispersiveness will become small and a sufficient improvement cannot be expected. If condition (2) is departed from, it will become difficult to balance chromatic aberration and this may undesirably result in an increased refractive power of each lens or an increased number of lenses.

In such basic construction of the present invention, to minimize the aforementioned lateral chromatic aberration occurring in the positive first group and further reduce the fluctuation of lateral chromatic aberration during magnification change, it is desirable that at least one of the positive lenses constituting the first group be formed of a material which satisfies the following condition:

$$vd + 596.7\theta > 395 \quad (3)$$

$$vd > 55 \quad (4)$$

According to these conditions, the secondary spectrum of the lateral chromatic aberration created by the first group can be made small and therefore, the lateral chromatic aberration when the focal length of the entire system is small is somewhat aggravated, while when the focal length of the entire system is great, the lateral chromatic aberration is greatly improved. If the limit of condition (3) is departed from, the abnormal dispersiveness of the glass will become weaker and a great effect cannot be expected. If condition (4) is departed from, it will become difficult to balance chromatic aberration and this may undesirably result in an increased refractive power of each lens or an increased number of lenses.

A simple construction which enables the above-described present invention to be applied to a zoom lens for enlargement or copying is one that comprises three positive, negative and positive lens groups. Specifically, in succession from the object side, a first group having a positive focal length, a second group having a negative focal length and a third group having a positive focal length are disposed and an aperture stop is disposed between the third group and the second group and more adjacent to the third group, the first group and the third group being moved on the optic axis together with each other and the second group being moved on the optic axis following the movement of the first and third groups to keep the object-image distance of the focal length as the entire system constant. The specific construction of each group may be such that, as shown, for example, in the first embodiment of FIG. 5, the first group G₁ comprises, in succession from the object side, three lenses L₁, L₂ and L₃ having a negative, a positive and a positive focal length, respectively, and the former two lenses L₁ and L₂ may be cemented together. The second group G₂ comprises, in succession from the object side, a negative meniscus lens L₄ having its convex surface facing the object side, a cemented negative lens L₅ and a positive meniscus lens L₆ having its convex surface facing the object side. The third group G₃ comprises, in succession from the object side, one or more positive lenses L₇, a negative lens L₈ and one or two positive lenses L₉ including a cemented lens. It is desirable that at least one of the negative lenses constituting the negative meniscus lens L₄ and the cemented negative lens L₅ in the second group G₂ be formed of an optical material which satisfies conditions (1) and (2), and further, it is desirable that at least one of the two positive lenses L₂ and L₃ in the first group G₁ be formed of an optical material which satisfies conditions (3) and (4).

Figure 7:
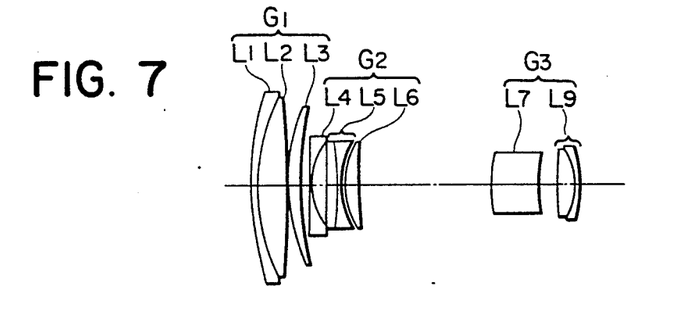
Figure 8A:
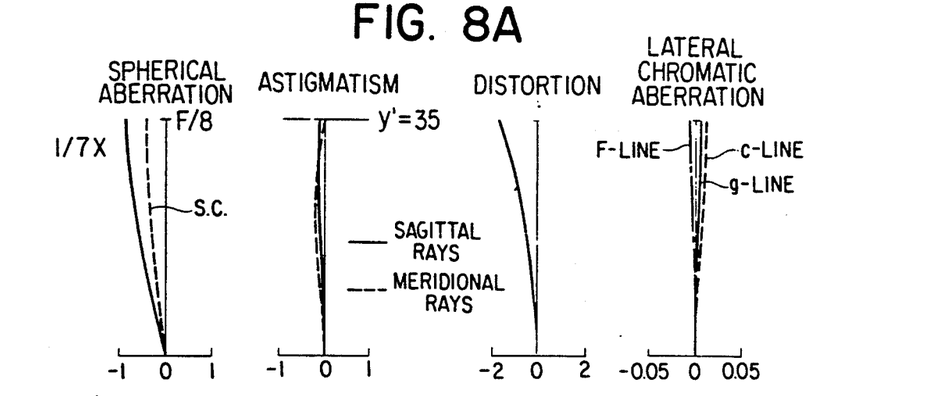
FIGS. 8A to 8D, 9A to 9D and 10A to 10D show the various aberrations in the first, second and third embodiments, respectively.
Figure 8B:
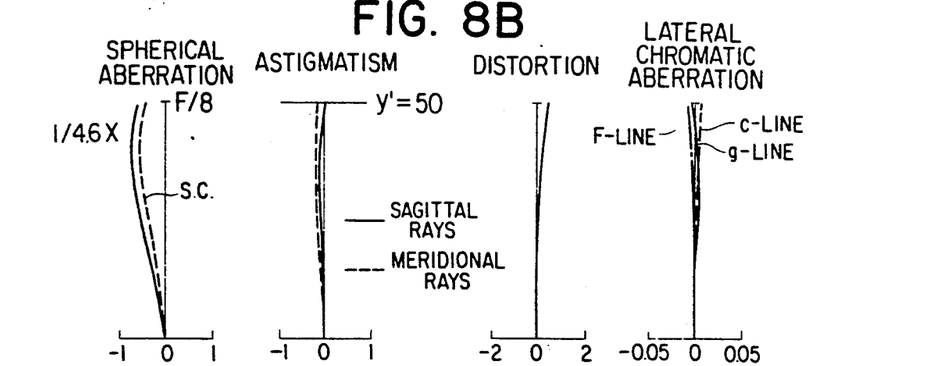
Figure 8C:
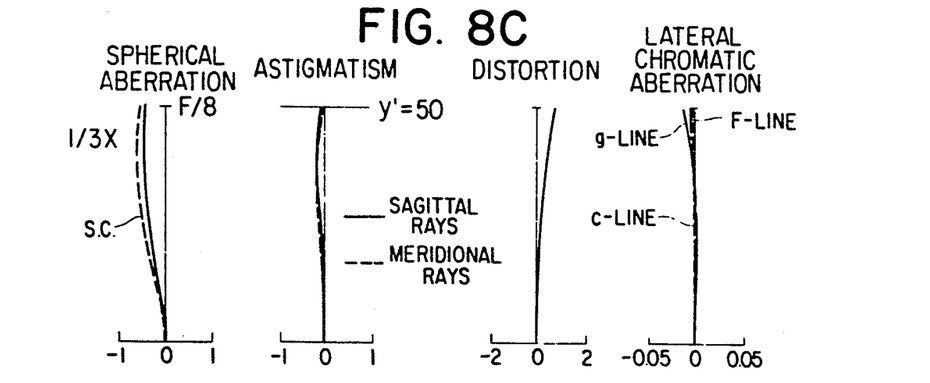
Figure 8D:
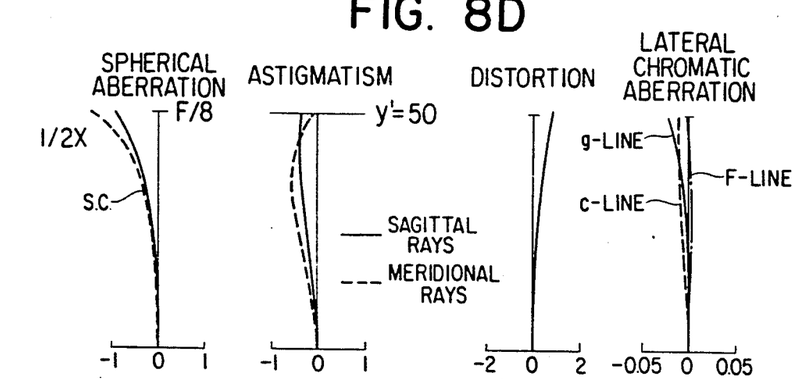
Figure 9A:
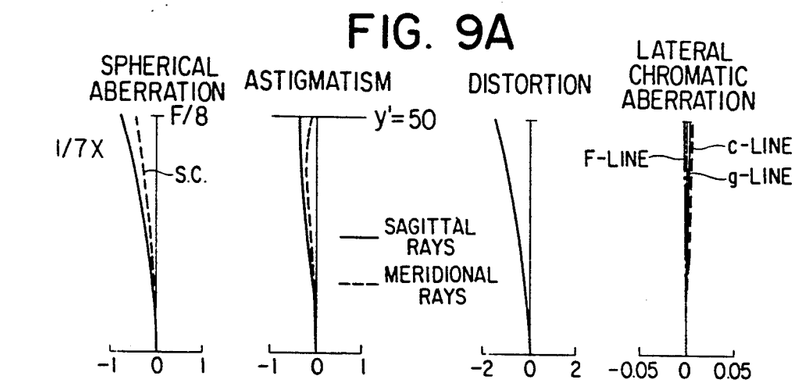
Figure 9B:
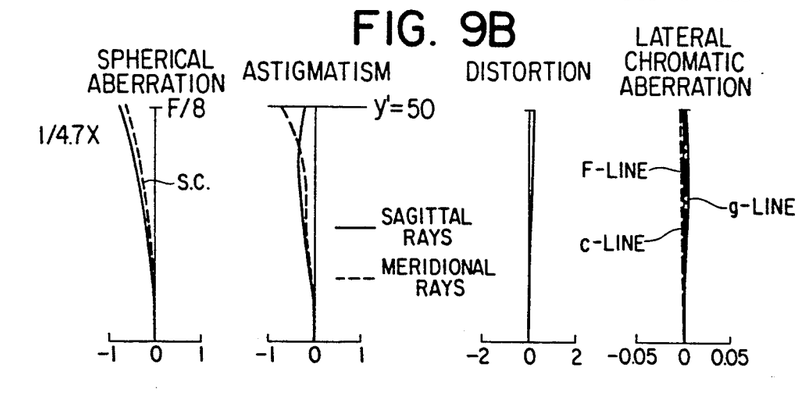
Figure 9C:
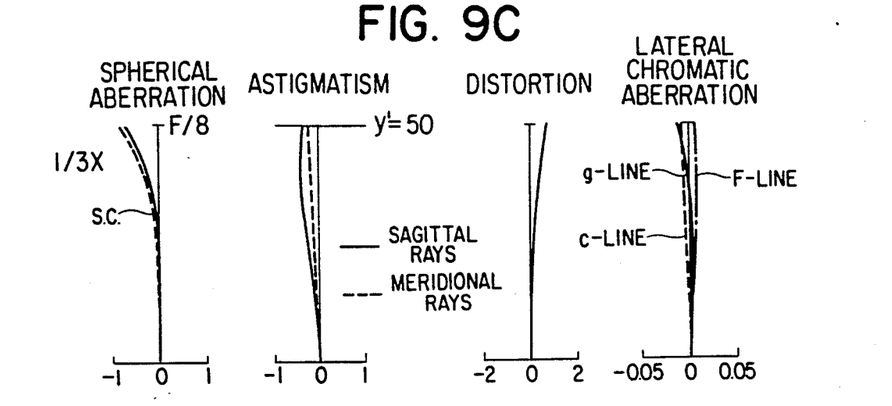
Figure 9D:
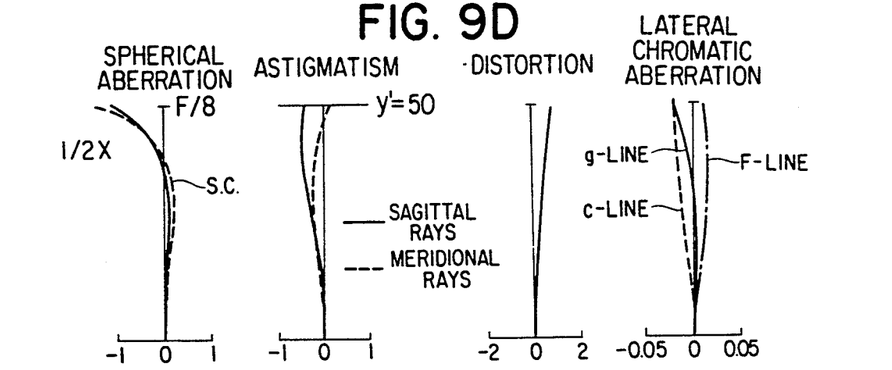
Figure 10A:
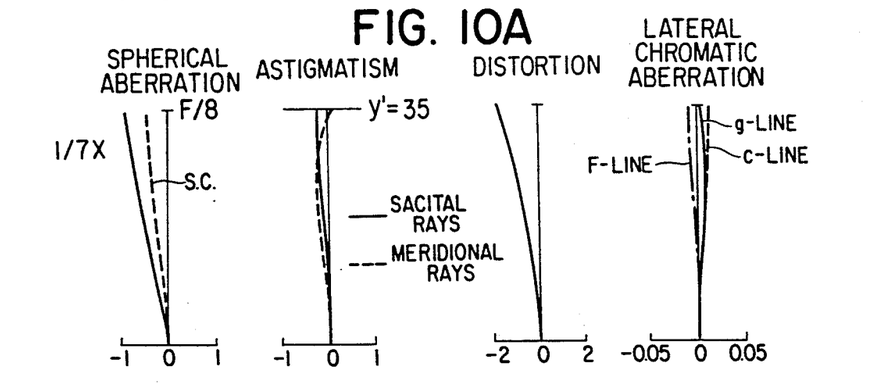
Figure 10B:
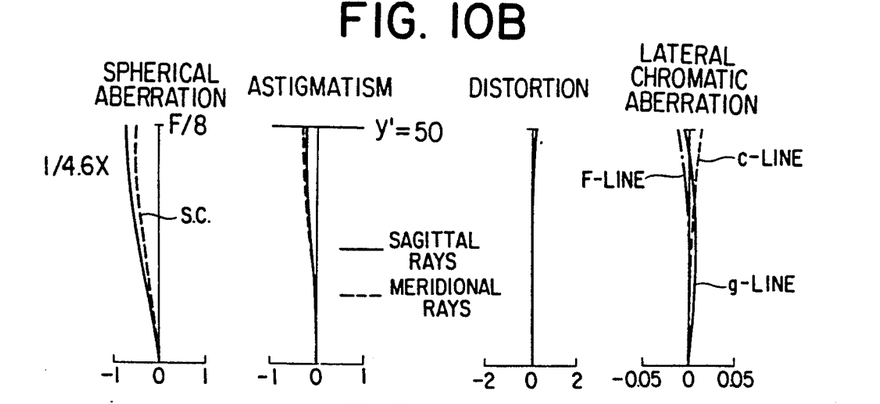
Figure 10C:
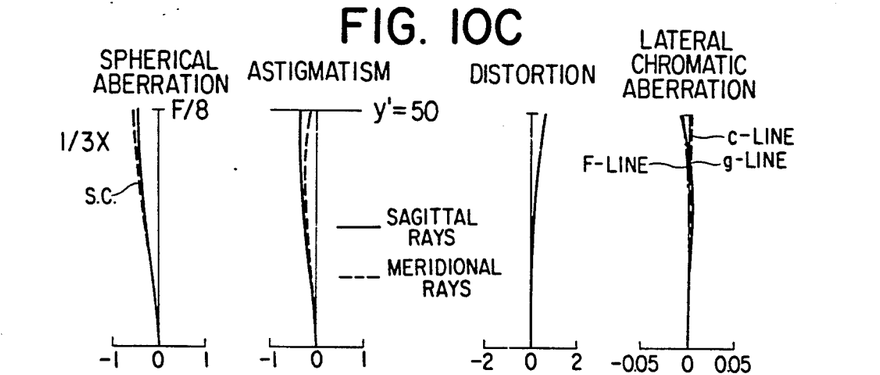
Figure 10D:
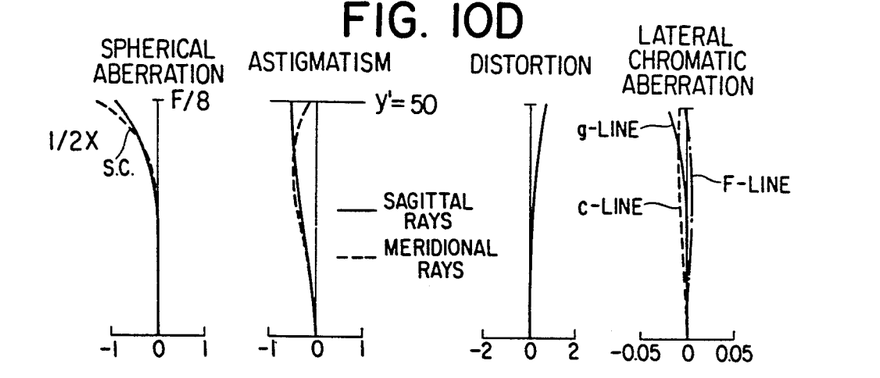

The negative lens L₈ of the third group may be omitted as shown in FIG. 7 if the center thickness t of the positive lens L₇ forward thereof is $$t > 0.15 f_3$$

relative to the focal length f₃ of the third group. In this case, the positive lens L₇ should desirably be of a meniscus shape having its convex surface facing the object side. Also, in the case of the type in which the first group and the third group are moved together to thereby accomplish a magnification change, when the object-image distance is l and the focal length of the first group is f₁ and the magnification zoom ratio is x and the spacing between the principal points of the first group and the third group is D, it is desirable that these factors satisfy the following conditions:

$$1.1 < f_1/D < 1.5 \quad (5)$$

$$0.046 < D/(l\sqrt{x}) < 0.066 \quad (6)$$

If the lower limit of condition (5) is exceeded, the first and third groups will be reversed in their direction of movement within the magnification range and, if an attempt is made to avoid it, bulkiness of the entire system will result therefrom and this is not effective. If the upper limit of condition (5) is exceeded, the amounts of forward movement of the first and third groups will become too great and this will result in complication of the mechanism and bulkiness of the entire system. If the lower limit of condition (6) is exceeded, the amounts of movement of the first and third groups will become too great, and if the upper limit of condition (6) is exceeded, the refractive power of each group can be weakened but the entire system will become bulky.

In the zoom lens of such a three-group construction, to correct the secondary spectrum of the on-axis chromatic aberration better, it is advantageous that at least one of the positive lenses in the third group is formed of a material which satisfies the following conditions:

$$vd + 596.7\theta > 395$$

$$vd > 55.$$

Some embodiments of the present invention will hereinafter be described.

Figure 5:
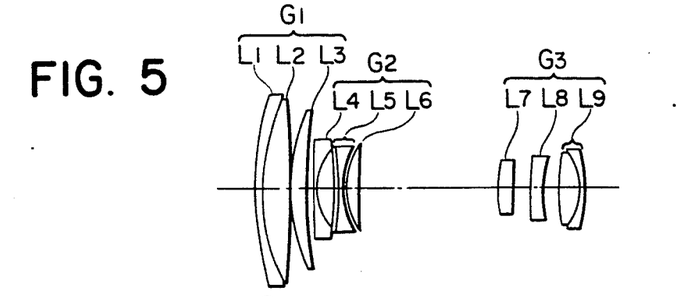
FIGS. 5, 6 and 7 show the lens constructions of first, second and third embodiments, respectively, of the present invention.
Figure 6:
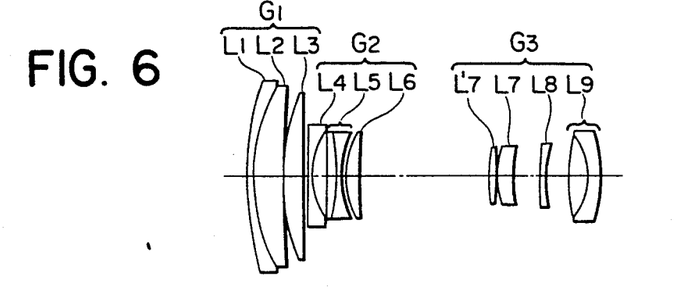

Each of first to third embodiments of the present invention is a zoom lens of the above-described three-group construction in which the object-image distance is of the order of 1 m and which permits the film size to be the brownie format and the print size to be up to maximum 11"×14" and in which the magnification range is seven times to two times and F-number is 8 and which is for use for a finite distance. They are enlarging zoom lenses, but it is well known that they become reducing zoom lenses if the system is used in the reverse direction, and in the description of the present invention, a case where they are used as reducing zoom lenses is supposed. The lens construction of the first to third embodiments are as shown in FIGS. 5 to 7, respectively. The numerical data of the respective embodiments are as shown in the tables below. In each of the tables, r represents the radius of curvature of each lens surface, d represents the center thickness and the air space of each lens, nd represents the refractive index for d-line (λ=587.6 nm), vd represents the Abbe number with d-line as the reference, and θ represents the part dispersion ratio as described above. Also, in each of the tables, the leftmost numbers represent the order from the incident light side.

First Embodiment

| | r | d | nd | vd | θ | | |
|---|---|---|---|---|---|---|---|
| 1 | +142.190 | 2.63 | 1.71736 | 29.5 | 0.598 | L₁ | |
| 2 | +82.533 | 12.74 | 1.49782 | 82.3 | 0.542 | L₂ | G₁ |
| 3 | −483.867 | 0.10 | 1.0 | | | | |
| 4 | +76.769 | 7.00 | 1.49782 | 82.3 | 0.542 | L₃ | |
| 5 | +203.090 | D₁ (variable) | | | | | |
| 6 | +619.932 | 1.42 | 1.59319 | 67.9 | 0.544 | L₄ | |
| 7 | +25.832 | 7.08 | 1.0 | | | | |
| 8 | −311.324 | 3.62 | 1.71736 | 29.5 | 0.598 | L₅ | G₂ |
| 9 | −86.300 | 1.62 | 1.59319 | 67.9 | 0.544 | | |
| 10 | +50.842 | 1.41 | 1.0 | | | | |
| 11 | +37.180 | 4.32 | 1.71700 | 48.1 | 0.556 | L₆ | |
| 12 | +144.368 | D₂ (variable) | | | | | |
| 13 | +41.012 | 6.41 | 1.49782 | 82.3 | 0.542 | L₇ | |
| 14 | +178.844 | 7.78 | 1.0 | | | | |
| 15 | +420.448 | 5.43 | 1.51454 | 54.6 | 0.550 | L₈ | G₃ |
| 16 | +53.028 | 7.61 | 1.0 | | | | |
| 17 | +112.927 | 8.16 | 1.51680 | 64.1 | 0.535 | L₉ | |
| 18 | −22.840 | 1.53 | 1.66755 | 42.0 | 0.575 | | |
| 19 | −52.642 | | | | | | |

| f = 98.4~235.7, F-number 8 | | | | |
|---|---|---|---|---|
| β | −0.143 | −0.220 | −0.330 | −0.500 |
| D₁ | 2.99 | 22.99 | 39.99 | 58.49 |
| D₂ | 61.97 | 41.97 | 24.97 | 6.47 |
| Bf | 174.73 | 196.74 | 218.34 | 233.63 |

$$f_1 = 134.5$$
$$f_2 = -52.472$$
$$f_3 = 91.296$$

Second Embodiment

| | r | d | nd | vd | θ | | |
|---|---|---|---|---|---|---|---|
| 1 | +128.824 | 2.6 | 1.72825 | 28.3 | 0.605 | L₁ | |
| 2 | +67.312 | 13.5 | 1.49782 | 82.3 | 0.542 | L₂ | G₁ |
| 3 | −358.439 | 0.1 | | | | | |
| 4 | +92.232 | 8.5 | 1.69350 | 53.8 | 0.550 | L₃ | |
| 5 | +930.892 | D₁ (variable) | | | | | |
| 6 | +548.706 | 1.6 | 1.59319 | 67.9 | 0.544 | L₄ | |
| 7 | +27.060 | 7 | | | | | |
| 8 | −440.630 | 4.5 | 1.71736 | 29.5 | 0.598 | L₅ | G₂ |
| 9 | −87.885 | 1.6 | 1.59319 | 67.9 | 0.544 | | |
| 10 | +49.352 | 2.0 | | | | | |
| 11 | +38.065 | 5.2 | 1.71700 | 48.1 | 0.556 | L₆ | |
| 12 | +119.535 | D₂ (variable) | | | | | |
| 13 | +64.566 | 3.0 | 1.49782 | 82.3 | 0.542 | L₇ | |
| 14 | ∞ | 0.1 | | | | | |
| 15 | +36.401 | 7.7 | 1.49782 | 82.3 | 0.542 | L₇ | |
| 16 | +55.012 | 11.4 | | | | | G₃ |
| 17 | +101.943 | 1.5 | 1.79631 | 41.0 | 0.568 | L₈ | |
| 18 | +37.651 | 10.4 | | | | | |
| 19 | +65.962 | 8.6 | 1.51680 | 64.1 | 0.535 | L₉ | |
| 20 | −29.015 | 5.6 | 1.74400 | 45.1 | 0.562 | | |
| 21 | −65.239 | | | | | | |

| f = 98.0~231.6, F-number 8 | | | | |
|---|---|---|---|---|
| β | −0.143 | −0.215 | −0.325 | −0.500 |
| D₁ | 2.34 | 20.84 | 37.84 | 56.34 |
| D₂ | 58.34 | 39.84 | 22.84 | 4.34 |
| Bf | 155.34 | 176.16 | 198.58 | 215.77 |

$$f_1 = 133.0$$
$$f_2 = -51.909$$
$$f_3 = 89.027$$

Third Embodiment

| | r | d | nd | vd | θ | | |
|---|---|---|---|---|---|---|---|
| 1 | +144.161 | 2.63 | 1.71736 | 29.5 | 0.598 | L₁ | |
| 2 | +81.871 | 12.74 | 1.49782 | 82.3 | 0.542 | L₂ | G₁ |
| 3 | −438.104 | 0.1 | | | | | |
| 4 | +72.320 | 7.0 | 1.49782 | 82.3 | 0.542 | L₃ | |
| 5 | +171.932 | D₁ (variable) | | | | | |
| 6 | +608.486 | 1.41 | 1.59319 | 67.9 | 0.544 | L₄ | |
| 7 | +26.822 | 7.05 | | | | | G₂ |
| 8 | −1192.859 | 4.53 | 1.71736 | 29.5 | 0.598 | L₅ | |

-continued

Third Embodiment

| | r | d | nd | vd | θ | |
|---|---|---|---|---|---|---|
| 9 | −98.582 | 1.61 | 1.59319 | 67.9 | 0.544 | |
| 10 | +51.421 | 2.01 | | | | |
| 11 | +37.428 | 5.23 | 1.71700 | 48.1 | 0.556 | L₆ |
| 12 | +99.739 | D₂ (variable) | | | | |
| 13 | +42.298 | 21.26 | 1.49782 | 82.3 | 0.542 | L₇ |
| 14 | +49.126 | 8.6 | | | | |
| 15 | +124.928 | 8.0 | 1.51454 | 54.6 | 0.550 | L₉ |
| 16 | −23.509 | 2.0 | 1.67270 | 32.2 | 0.592 | |
| 17 | −53.188 | | | | | | f = 98.7~233.4, F-number 8

| β | −0.143 | −0.219 | −0.330 | −0.500 |
|---|---|---|---|---|
| D₁ | 2.56 | 22.06 | 39.06 | 57.06 |
| D₂ | 59.22 | 39.72 | 22.72 | 4.72 |
| Bf | 170.49 | 197.27 | 214.48 | 230.87 |

$f_1 = 134.5$
$f_2 = -52.232$
$f_3 = 89.50$

The aberrations for each of magnifications 1/7 to ½ with respect to the above-described first, second and third embodiments are shown in FIGS. 8, 9 and 10, respectively. In each embodiment, the stop is disposed at a position of 1 mm immediately in front of the third group. In each of the spherical aberration graphs, the sine condition offence (S.C.) is indicated by dotted line, and as the lateral chromatic aberration, with d-line (λ=588 nm) as the reference, c-line (λ=656 nm), F-line (λ=486 nm) and g-line (λ=436 nm) are shown.

It can be seen from each aberration graph that in any embodiment, the various aberrations are well corrected over the entire magnification change range by zooming and particularly, fluctuation of lateral chromatic aberration is corrected to a very small value and an excellent imaging performance is always kept.

According to the present invention, as described above, there is achieved a zoom lens in which during magnification change, fluctuation of the various aberrations, particularly lateral chromatic aberration, is small and an excellent imaging performance is always maintained over the entire magnification change range, and this zoom lens also has an excellent performance as a short distance zoom lens for enlargement or copying and therefore, at any magnification of enlargement or reduction, with the object-image distance being fixed, it is possible to obtain clear color images always having little blotting of colors.

I claim:

1. A zoom lens in which fluctuation of lateral chromatic aberration is small during magnification change and which can maintain an excellent imaging performance over the entire magnification change range, said zoom lens having, in succession from the object side, a first group of positive refractive power including at least one positive lens, a second group of negative refractive power including at least one negative lens, and an aperture stop disposed closer to the image plane than said second group, each of said groups being moved on the optic axis during magnification change so that the distance between said first group and said second group becomes greater and the distance between said second group and said aperture stop becomes smaller as the focal length of the entire system becomes longer, at least one of negative lenses constituting said second group being formed of a material which satisfies the following conditions:

$$vd + 596.7\theta > 386.5$$

$$vd > 55,$$

where, when the refractive indices of the lens material for wavelengths 436 nm (g-line), 486 nm (F-line), 588 nm (d-line) and 656 nm (c-line) are ng, nF, nd and nc, respectively, vd and θ are defined as follows:

$$vd = (nd-1)/(nF-nc)$$

$$\theta = (ng-nF)/(nF-nc).$$

2. A zoom lens according to claim 1, wherein at least one of positive lenses constituting said first group is formed of a material which satisfies the following conditions:

$$vd + 596.7\theta > 395$$

$$vd > 55.$$

3. A zoom lens according to claim 2, wherein said first group (G₁) comprises, in succession from the object side, three lenses (L₁, L₂, L₃) having a netative, a positive and a positive focal length, respectively, and said second group (G₂) comprises, in succession from the object side, a negative meniscus lens (L₄) having its convex surface facing the object side, a cemented negative lens (L₅), and a positive meniscus lens (L₆) having its convex surface facing the object side.

4. A zoom lens according to claim 1, further having a third group of positive refractive power disposed near said aperture stop, said first group and said third group being moved together on the optic axis for magnification change and wherein said first group and said third group satisfy the following conditions:

$$1.1 < f_1/D < 1.5$$

$$0.046 < D/(l\sqrt{x}) < 0.066,$$

where l is the object-image distance, f₁ is the focal length of said first group, x is the magnification zoom ratio and D is the spacing between the principal points of said first group and said third group.

5. A zoom lens according to claim 4, wherein said third group has, in succession from the object side, a positive lens (L₇), a negative lens (L₈) and a positive lens (L₉) including a cemented surface.

6. A zoom lens according to claim 5, wherein numerical data are as follows:

| | r | d | nd | vd | θ | |
|---|---|---|---|---|---|---|
| 1 | +142.190 | 2.63 | 1.71736 | 29.5 | 0.598 | L₁ |
| 2 | +82.533 | 12.74 | 1.49782 | 82.3 | 0.542 | L₂ G₁ |
| 3 | −483.867 | 0.10 | 1.0 | | | |
| 4 | +76.769 | 7.00 | 1.49782 | 82.3 | 0.542 | L₃ |
| 5 | +203.090 | D₁ (variable) | | | | |
| 6 | +619.932 | 1.42 | 1.59319 | 67.9 | 0.544 | L₄ |
| 7 | +25.832 | 7.08 | 1.0 | | | |
| 8 | −311.324 | 3.62 | 1.71736 | 29.5 | 0.598 | L₅ G₂ |
| 9 | −86.300 | 1.62 | 1.59319 | 67.9 | 0.544 | |
| 10 | +50.842 | 1.41 | 1.0 | | | |
| 11 | +37.180 | 4.32 | 1.71700 | 48.1 | 0.556 | L₆ |
| 12 | +144.368 | D₂ (variable) | | | | |
| 13 | +41.012 | 6.41 | 1.49782 | 82.3 | 0.542 | L₇ |
| 14 | +178.844 | 7.78 | 1.0 | | | |

-continued

| | r | d | nd | vd | θ | | |
|---|---|---|---|---|---|---|---|
| 15 | +420.448 | 5.43 | 1.51454 | 54.6 | 0.550 | $L_8$ | |
| 16 | +53.028 | 7.61 | 1.0 | | | | $G_3$ |
| 17 | +112.927 | 8.16 | 1.51680 | 64.1 | 0.535 | $L_9$ | |
| 18 | −22.840 | 1.53 | 1.66755 | 42.0 | 0.575 | | |
| 19 | −52.642 | | | | | | |

| | f = 98.4∼235.7, F-number 8 | | | |
|---|---|---|---|---|
| β | −0.143 | −0.220 | −0.330 | −0.500 |
| $D_1$ | 2.99 | 22.99 | 39.99 | 58.49 |
| $D_2$ | 61.97 | 41.97 | 24.97 | 6.47 |
| Bf | 174.73 | 196.74 | 218.34 | 233.63 |

$$f_1 = 134.5$$
$$f_2 = -52.472$$
$$f_3 = 91.296$$

where r represents the radius of curvature of each lens surface, d represents the center thickness and the air space of each lens, nd represents the refractive index for d-line (λ=587.6 nm), νd represents the Abbe number with d-line as the reference, θ represents the part dispersion ratio, and the leftmost numbers represent the order from the incident light side.

7. A zoom lens according to claim 5, wherein numerical data are as follows:

| | r | d | nd | vd | θ | | |
|---|---|---|---|---|---|---|---|
| 1 | +128.824 | 2.6 | 1.72825 | 28.3 | 0.605 | $L_1$ | |
| 2 | +67.312 | 13.5 | 1.49782 | 82.3 | 0.542 | $L_2$ | $G_1$ |
| 3 | −358.439 | 0.1 | | | | | |
| 4 | +92.232 | 8.5 | 1.69350 | 53.8 | 0.550 | $L_3$ | |
| 5 | +930.892 | $D_1$ (variable) | | | | | |
| 6 | +548.706 | 1.6 | 1.59319 | 67.9 | 0.544 | $L_4$ | |
| 7 | +27.060 | 7 | | | | | |
| 8 | −440.630 | 4.5 | 1.71736 | 29.5 | 0.598 | $L_5$ | $G_2$ |
| 9 | −87.885 | 1.6 | 1.59319 | 67.9 | 0.544 | | |
| 10 | +49.352 | 2.0 | | | | | |
| 11 | +38.065 | 5.2 | 1.71700 | 48.1 | 0.556 | $L_6$ | |
| 12 | +119.535 | $D_2$ (variable) | | | | | |
| 13 | +64.566 | 3.0 | 1.49782 | 82.3 | 0.542 | $L_7$ | |
| 14 | ∞ | 0.1 | | | | | |
| 15 | +36.401 | 7.7 | 1.49782 | 82.3 | 0.542 | $L_7$ | |
| 16 | +55.012 | 11.4 | | | | | $G_3$ |
| 17 | +101.943 | 1.5 | 1.79631 | 41.0 | 0.568 | $L_8$ | |
| 18 | +37.651 | 10.4 | | | | | |
| 19 | +65.962 | 8.6 | 1.51680 | 64.1 | 0.535 | $L_9$ | |
| 20 | −29.015 | 5.6 | 1.74400 | 45.1 | 0.562 | | |
| 21 | −65.239 | | | | | | |

| | f = 98.0∼231.6, F-number 8 | | | |
|---|---|---|---|---|
| β | −0.143 | −0.215 | −0.325 | −0.500 |
| $D_1$ | 2.34 | 20.84 | 37.84 | 56.34 |
| $D_2$ | 58.34 | 39.84 | 22.84 | 4.34 |
| Bf | 155.34 | 176.16 | 198.58 | 215.77 |

$$f_1 = 133.0$$
$$f_2 = -51.909$$
$$f_3 = 89.027$$

where r represents the radius of curvature of each lens surface, d represents the center thickness and the air space of each lens, nd represents the refractive index for d-line (λ=587.6 nm), νd represents the Abbe number with d-line as the reference, θ represents the part dispersion ratio, and the leftmost numbers represent the order from the incident light side.

8. A zoom lens according to claim 4, wherein said third group includes, in succession from the object side, a positive meniscus lens ($L_7$) having its convex surface facing the object side, and a cemented positive lens ($L_9$).

9. A zoom lens according to claim 8, satisfying the following conditions:

$$t > 0.15 f_3,$$

where t is the center thickness of the positive meniscus lens ($L_7$) in said third group, and $f_3$ is the focal length of said third group.

10. A zoom lens according to claim 9, wherein numerical data are as follows:

| | r | d | nd | vd | θ | | |
|---|---|---|---|---|---|---|---|
| 1 | +144.161 | 2.63 | 1.71736 | 29.5 | 0.598 | $L_1$ | |
| 2 | +81.871 | 12.74 | 1.49782 | 82.3 | 0.542 | $L_2$ | $G_1$ |
| 3 | −438.104 | 0.1 | | | | | |
| 4 | +72.320 | 7.0 | 1.49782 | 82.3 | 0.542 | $L_3$ | |
| 5 | +171.932 | $D_1$ (variable) | | | | | |
| 6 | +608.486 | 1.41 | 1.59319 | 67.9 | 0.544 | $L_4$ | |
| 7 | +26.822 | 7.05 | | | | | |
| 8 | −1192.859 | 4.53 | 1.71736 | 29.5 | 0.598 | $L_5$ | $G_2$ |
| 9 | −98.582 | 1.61 | 1.59319 | 67.9 | 0.544 | | |
| 10 | +51.421 | 2.01 | | | | | |
| 11 | +37.428 | 5.23 | 1.71700 | 48.1 | 0.556 | $L_6$ | |
| 12 | +99.739 | $D_2$ (variable) | | | | | |
| 13 | +42.298 | 21.26 | 1.49782 | 82.3 | 0.542 | $L_7$ | |
| 14 | +49.126 | 8.6 | | | | | $G_3$ |
| 15 | +124.928 | 8.0 | 1.51454 | 54.6 | 0.550 | $L_9$ | |
| 16 | −23.509 | 2.0 | 1.67270 | 32.2 | 0.592 | | |
| 17 | −53.188 | | | | | | |

| | f = 98.7∼233.4, F-number 8 | | | |
|---|---|---|---|---|
| β | −0.143 | −0.219 | −0.330 | −0.500 |
| $D_1$ | 2.56 | 22.06 | 39.06 | 57.06 |
| $D_2$ | 59.22 | 39.72 | 22.72 | 4.72 |
| Bf | 170.49 | 197.27 | 214.48 | 230.87 |

$$f_1 = 134.5$$
$$f_2 = -52.232$$
$$f_3 = 89.50$$

where r represents the radius of curvature of each lens surface, d represents the center thickness and the air space of each lens, nd represents the refractive index for d-line (λ=587.6 nm), νd represents the Abbe number with d-line as the reference, θ represents the part dispersion ratio, and the leftmost numbers represent the order from the incident light side.

11. A zoom lens which can continuously effect magnification change while keeping a finite distance between an object surface and an image plane constant, said zoom lens comprising, in succession from the object side, a first group of positive refractive power including at least one positive lens, a second group of negative refractive power including at least one negative lens, and an aperture stop disposed closer to the image plane than said second group, each of said groups being moved on the optic axis during magnification change so that the distance between said first group and said second group becomes greater and the distance between said second group and said aperture stop becomes smaller as the focal length of the entire system becomes longer, at least one of negative lenses constituting said second group being formed of a material which satisfies the following conditions:

$$\nu d + 596.7\theta > 386.5 \tag{1}$$

$$\nu d > 55 \tag{2}$$

and at least one of positive lenses constituting said first group being formed of a material which satisfies the following conditions:

$$\nu d + 596.7\theta > 395 \quad (3)$$

$$\nu d > 55, \quad (4)$$

where, when the refractive indices of the lens material for wavelengths 436 nm (g-line), 486 nm (F-line), 588 nm (d-line) and 656 nm (c-line) are ng, nF, nd and nc, respectively, $\nu d$ and $\theta$ are as defined as follows:

$$\nu d = (nd - 1)/(nF - nc)$$

$$\theta = (ng - nF)/(nF - nc).$$

12. A zoom lens according to claim 11, further having a third group of positive refractive power disposed near said aperture stop, said first group and said third group being moved together on the optic axis for magnification change and wherein said first group and said third group satisfy the following conditions:

$$1.1 < f_1/D < 1.5$$

$$0.046 < D/(l\sqrt{x}) < 0.066,$$

where l is the object-image distance, $f_1$ is the focal length of said first group, x is the magnification zoom ratio and D is the spacing between the principal points of said first group and said third group.

* * * * *